(12) United States Patent
Tripp

(10) Patent No.: US 10,055,818 B2
(45) Date of Patent: Aug. 21, 2018

(54) METHODS, APPARATUS AND ARTICLES OF MANUFACTURE TO USE BIOMETRIC SENSORS TO CONTROL AN ORIENTATION OF A DISPLAY

(71) Applicant: Intel Corporation, Santa Clara, CA (US)

(72) Inventor: Jeffrey M. Tripp, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/282,412

(22) Filed: Sep. 30, 2016

(65) Prior Publication Data

US 2018/0096460 A1  Apr. 5, 2018

(51) Int. Cl.
| | | |
|---|---|---|
| *G06T 3/60* | (2006.01) | |
| *G06K 9/66* | (2006.01) | |
| *G06K 9/00* | (2006.01) | |
| *G06F 1/16* | (2006.01) | |
| *G06F 3/00* | (2006.01) | |

(52) U.S. Cl.
CPC .............. *G06T 3/60* (2013.01); *G06F 1/1684* (2013.01); *G06F 1/1686* (2013.01); *G06F 3/005* (2013.01); *G06K 9/00892* (2013.01); *G06K 9/66* (2013.01)

(58) Field of Classification Search
CPC  G06T 3/60; G06T 3/604; G06T 3/606; G06T 3/608; G09G 2340/0492
See application file for complete search history.

(56) References Cited

U.S. PATENT DOCUMENTS

| | | | | |
|---|---|---|---|---|
| 2004/0201595 A1* | 10/2004 | Manchester | .......... | G06F 1/1626 345/649 |
| 2013/0286049 A1* | 10/2013 | Yang | ........................ | G09G 5/38 345/649 |
| 2013/0324089 A1 | 12/2013 | Kim et al. | | |
| 2014/0092139 A1* | 4/2014 | Sullivan | ................... | G09G 5/00 345/649 |
| 2014/0160019 A1* | 6/2014 | Anda | ........................ | G09G 5/00 345/158 |
| 2015/0135108 A1 | 5/2015 | Pope et al. | | |

(Continued)

OTHER PUBLICATIONS

International Searching Authority, "International Search Report and Written Opinion", issued in connection with U.S. Appl. No. PCT/US2017/048226, dated Oct. 30, 2017 (13 pages).

*Primary Examiner* — Jeffery A Brier
(74) *Attorney, Agent, or Firm* — Hanley, Flight and Zimmerman, LLC

(57) ABSTRACT

Methods, systems and articles of manufacture for a portable electronic device that uses biometric content to determine an orientation in which a display device is presenting content are disclosed. Example electronic devices include a display device, a biometric sensor to capture a biometric sample, and an orientation determination tool to determine a device orientation relative to a user based on the biometric sample. Example devices further include an orientation adjustment tool to change a content orientation in which the display device of the portable electronic device presents content based on the determination of the device orientation of the at least one of the display device and the portable electronic device. In some examples, the biometric sensor is a fingerprint sensor or an image sensor.

16 Claims, 11 Drawing Sheets

(56) References Cited

U.S. PATENT DOCUMENTS

2015/0278998 A1* 10/2015 Jothiswaran .............. G06T 3/60
                                                      345/650
2015/0309569 A1* 10/2015 Kohlhoff ................. G06F 3/013
                                                      345/156
2016/0077592 A1*  3/2016 Bhesania ................ G06F 3/011
                                                      345/650
2016/0247261 A1*  8/2016 Rhodes .................. G06F 3/013
2016/0372088 A1* 12/2016 Dow ....................... G09G 5/38

* cited by examiner

| BIOMETRIC DATA SETS | DEVICE ORIENTATION ID |
|---|---|
| {FIRST FINGERPRINT F1, F2, F3} | OR1ID |
| {SECOND FINGERPRINT F1, F2, F3} | OR2ID |
| {THIRD FINGERPRINT F1, F2, F3} | OR3ID |
| {FOURTH FINGERPRINT F1, F2, F3} | OR4ID |

FIG. 5

METHODS, APPARATUS AND ARTICLES OF MANUFACTURE TO USE BIOMETRIC SENSORS TO CONTROL AN ORIENTATION OF A DISPLAY

FIELD OF THE DISCLOSURE

This disclosure relates generally to portable electronic devices, and, more particularly, to using a biometric sensor to control an orientation of a display of a portable electronic device.

BACKGROUND

Portable electronic devices having a display are typically capable of changing the orientation in which content/information is presented on the display device. Positional sensors, installed in the portable electronic devices, use one or more methods to identify a position or orientation of the device. Such methods can include motion sensors, gravitational sensors, accelerometers, magnetic field sensors, an imaging sensor, etc. In response to the positioning information obtained by the positional sensors, a display device controller controls an orientation at which information is to be presented on the display/screen. Thus, when a user is holding the portable electronic device in an upright orientation, the display device controller causes the information to be presented in an upright orientation (vertical orientation) on the display/screen. When the user is holding the portable electronic device turned in a horizontal orientation (e.g., about 90° from the vertical position), the display device controller causes the information to be presented in a horizontal orientation (horizontally oriented) on the display/screen.

BRIEF DESCRIPTION OF THE DRAWINGS

FIG. 5 is an example set of biometric training data.

The figures are not to scale. Wherever possible, the same reference numbers will be used throughout the drawing(s) and accompanying written description to refer to the same or like parts.

DETAILED DESCRIPTION

Figure 1:
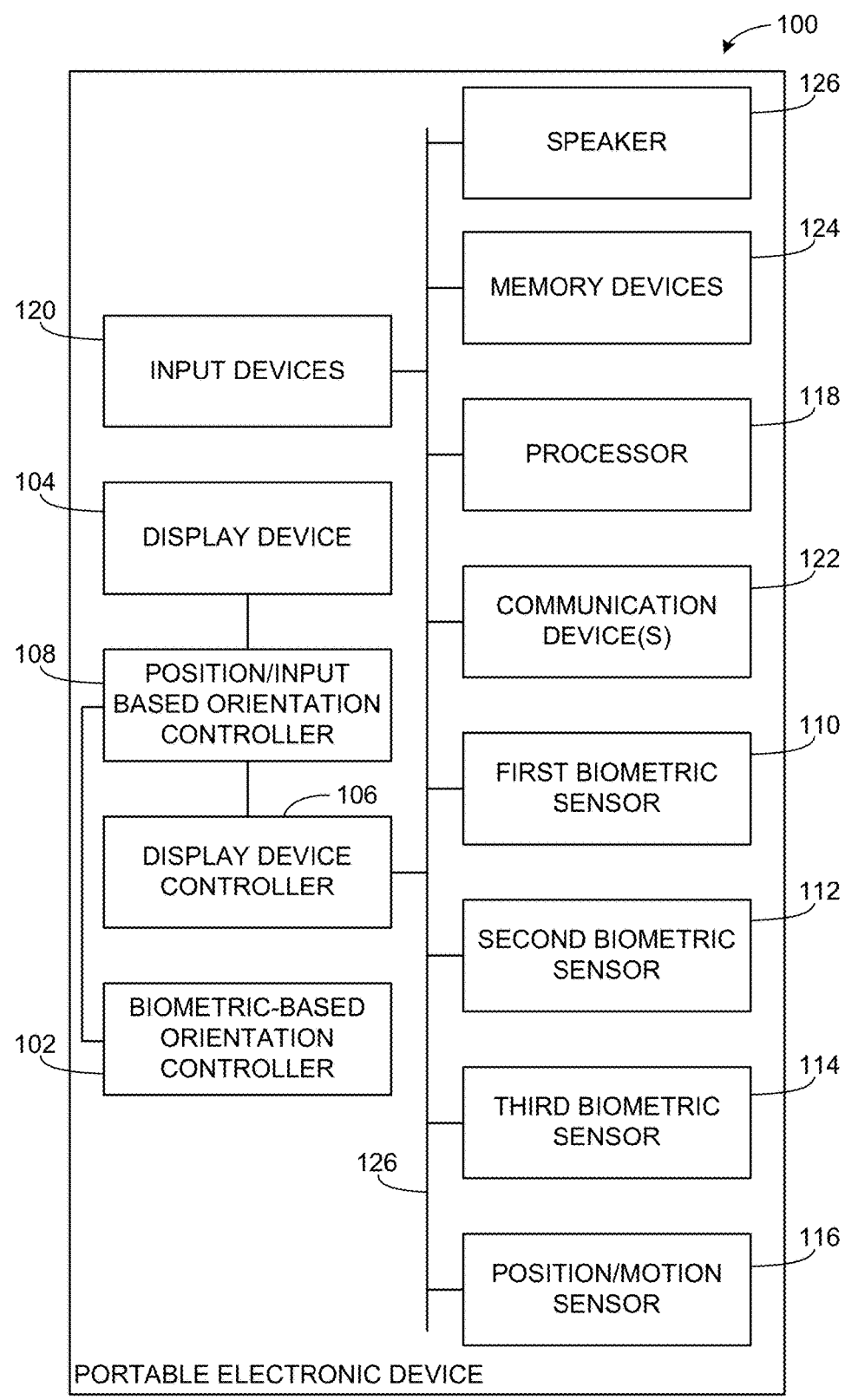
FIG. 1 is a block diagram of an example portable electronic device having an example biometric-based display orientation controller that uses biometric information to control an orientation at which information is presented on a display device.

Portable electronic devices having a display device include hardware/software configured to control an orientation of information presented on the display device. Positional sensors, installed (or otherwise integrated) in the portable electronic devices, use one or more methods to identify a position or orientation of the electronic device. Such methods can include motion sensors, accelerometers, magnetic field sensors, gravitational sensors, etc. A display device controller uses positioning information supplied by the positional sensors to control an orientation at which information is to be displayed/presented on the display device. Thus, when a user is holding the portable electronic device in a vertical, upright orientation, the display device controller causes the displayed content/information to be presented in a vertical, upright position. When the user is holding the portable electronic device turned on its right side in a horizontal orientation, the display device controller causes the displayed information to appear turned on its right side in a horizontal orientation, etc.

Unfortunately, existing methods and technologies to control the orientation of information presented on the display device can be clumsy at times and even detract from the user's viewing experience. In particular, some portable electronic devices are configured to enter a battery-conserving, lock mode when not in use for a threshold duration of time. Such devices are configured to monitor input information supplied on one or more input devices over time. When there is an absence of input information for a threshold amount of time, the operating system enters a lock mode in which the display screen turns off and the user is unable to access the device. To subsequently unlock the electronic device, the user activates an input device (e.g., presses a button), thereby causing a security verification message to be displayed on the screen. In some devices, the security verification message prompts the user to provide security information (e.g., a numeric code, a swipe pattern, a fingerprint verification) that, when verified by the device, causes the device to become unlocked and, thus, accessible to the user. In some portable electronic devices, the orientation of the security display message is set to be displayed in a vertical, upright orientation/position regardless of the position currently occupied by the electronic device. Thus, if the user is holding the device in a horizontal position when the security verification message is displayed, the user must to turn the device back to the vertical upright orientation/position to enter the security/verification code.

In some existing electronic devices, the orientation of the security display message is set to appear in an orientation that matches the orientation of the electronic device at the time that the electronic device became locked due to user inactivity. Thus, if information is being displayed in a horizontal position at the time of device inactivation (due to lack of user input), the security verification message will be displayed in a horizontal position when the user subsequently attempts to re-activate the device (e.g., presses an input of the device). However, the user may have re-oriented the electronic device while the electronic device was inactive causing the security verification message to appear in an orientation/position that doesn't align with the current orientation position of the device/user. In such circumstances, the user must either turn the electronic device to an orientation that matches the display orientation and/or manually activate the motion/position sensors by moving/jiggling the device to effect re-orientation of the displayed message. Depending on the viewing habits of the user, manual activation of the position sensors and/or re-orienting the electronic device may be required many times a day and even many times an hour which causes further user frustration.

Some portable electronic devices are configured to change the orientation of the display, as needed, to match the position currently occupied by the device. Thus, the display automatically moves from an upright orientation to a horizontal orientation when user turns the device from an upright orientation to a horizontal orientation, and vice versa. However, existing positional sensors do not always properly detect the change in the orientation of the device, thereby requiring the user to manually jiggle (or otherwise move) the device until the new position is sensed. Unfortunately, the position sensors may overreact to the movement causing the display to oscillate between several orientations before settling on an orientation that matches the orientation of the portable electronic device. In such circumstances, the user must simply wait until the position sensors are able to settle on the proper orientation and adjust the display orientation accordingly. Having to wait for the display to settle can also lend to user frustration. Thus, there is a need for improved methods, apparatus, and articles of manufacture to adjust a display orientation based on an orientation of an electronic device.

Methods, apparatus, and articles of manufacture disclosed herein determine an orientation of a portable electronic device relative to a user based on biometric information (e.g., fingerprints, facial images, etc.). Portable electronic devices employing the technology disclosed herein include biometric sensors configured to collect biometric information from a user. The biometric information is then used to identify an orientation of the device relative to the user. In some examples, a fingerprint sensor collects a fingerprint of the user and the fingerprint is used to identify the orientation of the portable electronic device. An orientation at which the display is currently causing information to be displayed is then determined. If alignment between the device orientation and the display orientation is confirmed, then re-orientation of the display is not performed. If alignment is not confirmed, re-orientation of the display is performed. In some examples, the fingerprint is collected when the user presses an input of the electronic device in an attempt to cause the electronic device to become active. The electronic device compares the orientation of the fingerprint to a set of previously captured fingerprints and, based on the comparison, determines whether the orientation of the device aligns with the current orientation of the display. The orientation of the display is then adjusted based on the determination. In some examples, the orientation of the portable electronic device is based on an image of the user collected by an image sensor (e.g., camera) disposed on the device. Facial recognition techniques are applied to the image to determine an orientation of the device relative to a user. Depending on a subsequent comparison of the device orientation to the display orientation, the electronic device orients or adjusts the orientation of the display to the proper position. Thus, the need to manually move the electronic device to adjust the display orientation is eliminated and/or greatly reduced thereby enhancing the user's viewing/interacting experience. Other advantages of using biometrics to adjust an orientation of a display in a portable electronic device are described below with reference to the figures.

FIG. 1 is a block diagram of an example portable electronic device 100 having an example biometric-based orientation controller 102 that uses biometric information to control an orientation at which an example display device 104 presents information. In some examples, the portable electronic device 100 includes the biometric-based orientation controller 102, the display device 104, an example display device controller 106, an example position/input-based orientation controller 108, an example first biometric sensor 110, an example second biometric sensor 112, an example third biometric sensor 114, an example position/motion sensor 116, an example processor 118, example input device(s) 120, example communication device(s) 122, example memory device(s) 124 and an example speaker 126 coupled to an example first communication bus 128. The processor 118 of this example receives content and/or commands from any of the input devices 120, the communication device(s) 122 and/or the memory device(s) 124. In some examples, the processor 118 transmits content/information to the display device controller 106. The display device controller 106 transforms the content/information into a format suitable for presentation on the display device 104 and subsequently sends the transformed content to the position/input-based orientation controller 108. The position/input-based orientation controller 108 controls an orientation at which the content/information is presented on the display device 102 (hereinafter referred to as the "display orientation") based on input supplied by the position/motion sensor 116 or by a control command entered by a user via any of the input devices 120. In some examples, the user can cause the display orientation to be locked in a particular orientation by selecting a lock command presented on the display device 104, or by actuating one of the input devices 120. In some cases, the display device 104 is a touch screen having touch sensors such that input information can be entered by touching the display device 104.

In some examples, the example first, second and/or third biometric sensors 110, 112, 114 supply biometric samples collected from a user to the example biometric-based orientation controller 102. The example biometric-based orientation controller 102 uses the biometric samples to determine an orientation of the example portable electronic device 100 relative to a user (referred to as the "device orientation"). In addition, the biometric-based orientation controller 102 determines an orientation at which the display device 104 is currently content/presenting information (referred to as the "content orientation") based on the biometric data collected by the sensors. If the device (e.g., housing) orientation does not match the content orientation, the biometric-based orientation controller 108 transmits a command to change the content orientation to the position/input-based orientation controller 108. The position/input-based orientation controller 108 responds to the command by changing the content orientation. In some examples, the command transmitted by the biometric-based orientation controller 102 identifies an orientation to which the displayed content is to be changed. In some examples, the position/input-based orientation controller 108 transmits information identifying the content orientation being used by the display device 104 to the biometric-based orientation controller 102. In some examples, the content orientation information is transmitted to the biometric-based orientation controller 102 each time the content orientation changes based on non-biometric based information (e.g., position/motion), thereby keeping the biometric-based controller 102 informed of the current content orientation.

Figure 2:
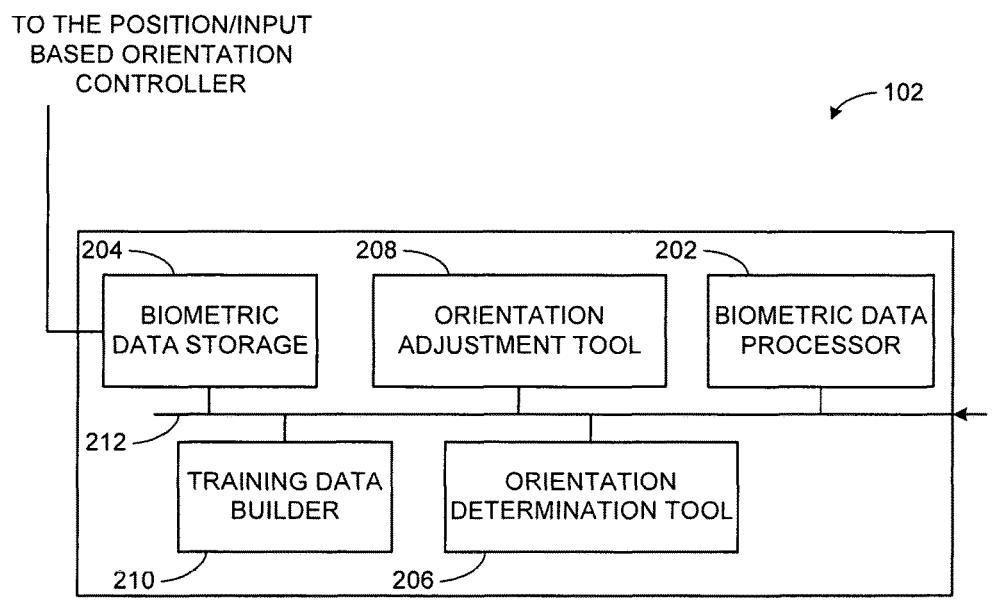
FIG. 2 is a block diagram of the example biometric-based orientation controller of FIG. 1.

FIG. 2 is a block diagram of the example biometric-based orientation controller 102 of FIG. 1. In some examples, the biometric-based orientation controller 102 includes an example biometric data processor 202, an example biometric data storage 204, an example orientation determination tool 206, an example orientation adjustment tool 208, and an example training data builder 210 coupled to an example second communication bus 212. In some examples, the training data builder 210 is configured to collect biometric samples from a user for use in building a biometric training data set. The biometric training data set to be collected depends on the type of biometric sensor that is used to collect the samples. In some examples, the first biometric sensor 110 (see FIG. 1) is a fingerprint sensor and the biometric training data set includes a set of fingerprints. In some examples, the second biometric sensor 112 (see FIG. 1) is an image sensor (e.g., a camera) and the biometric training data set includes a set of facial images. In some examples, the processor 118 (see FIG. 1) is configured to inform the biometric training data builder 210 as to the types of biometric sensors (e.g., the first biometric sensor 110, the second biometric sensor 112, the third biometric sensor 114) (see FIG. 1) available on the portable electronic device 100 and the biometric training data builder 210 is configured to generate a prompt (to be presented by the display device 104 or the example speaker 126) asking a user to indicate which of the available types of biometric sensors is preferred for use in controlling the display. In response to the user's selection, the biometric training data builder 210 begins collecting biometric training data for use in generating a biometric training data set. In some examples, the biometric training data builder 210 is configured to build multiple biometric training data sets corresponding to each of the types of available biometric sensors. Depending on the type of the biometric training data set to be built, the example biometric training data builder 210 generates prompts for presentation to the user on the example display device 104 (see FIG. 1), or via the example speaker 126 (see FIG. 1). The prompts instruct the user to hold the example portable electronic device 100 in various orientations and to supply biometric samples based on the orientations.

Figure 3:
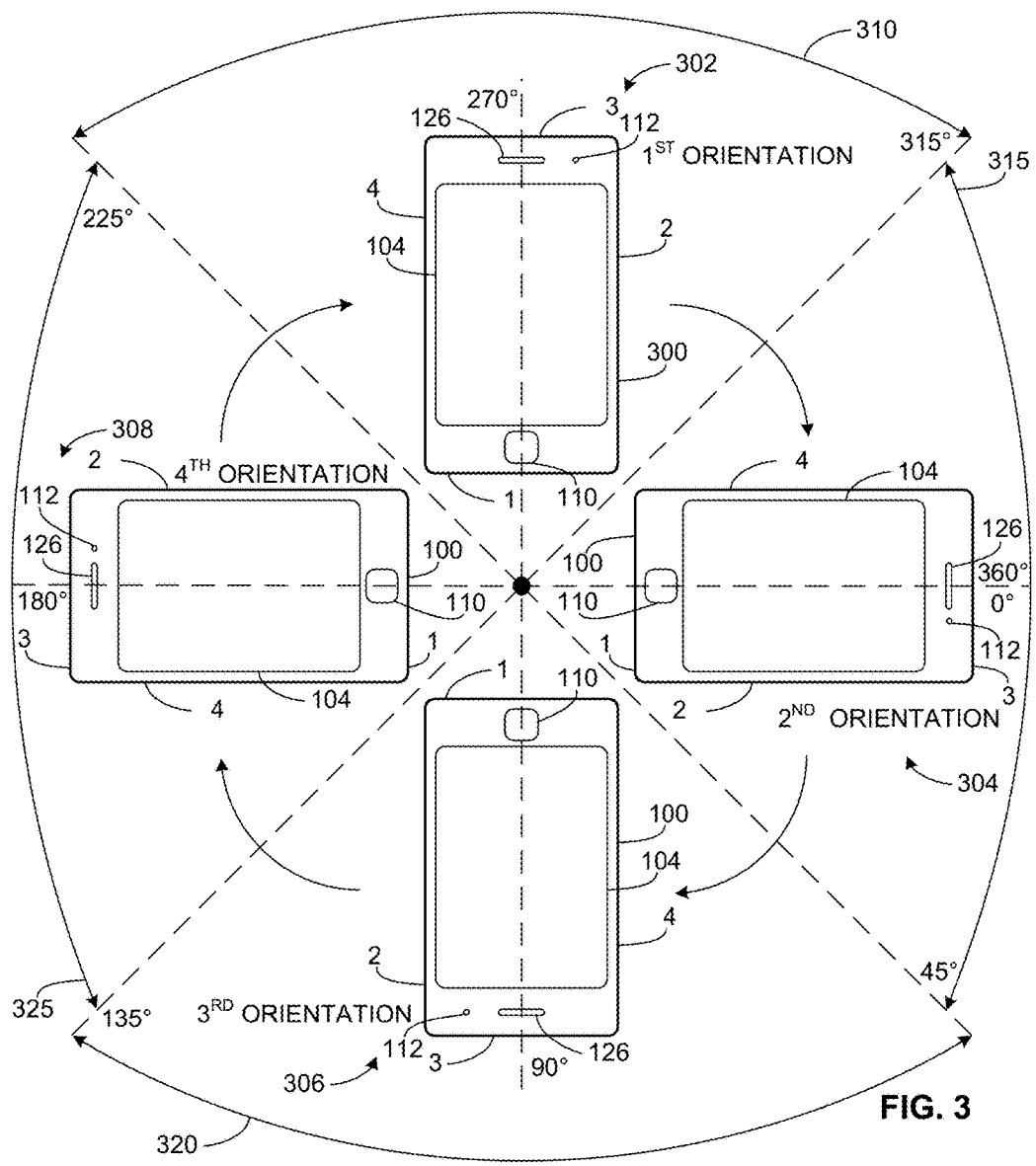
FIG. 3 is a schematic diagram of the example portable electronic device of FIG. 1 shown in a first orientation, a second orientation, a third orientation, and a fourth orientation.
Figures 4A, 4B:
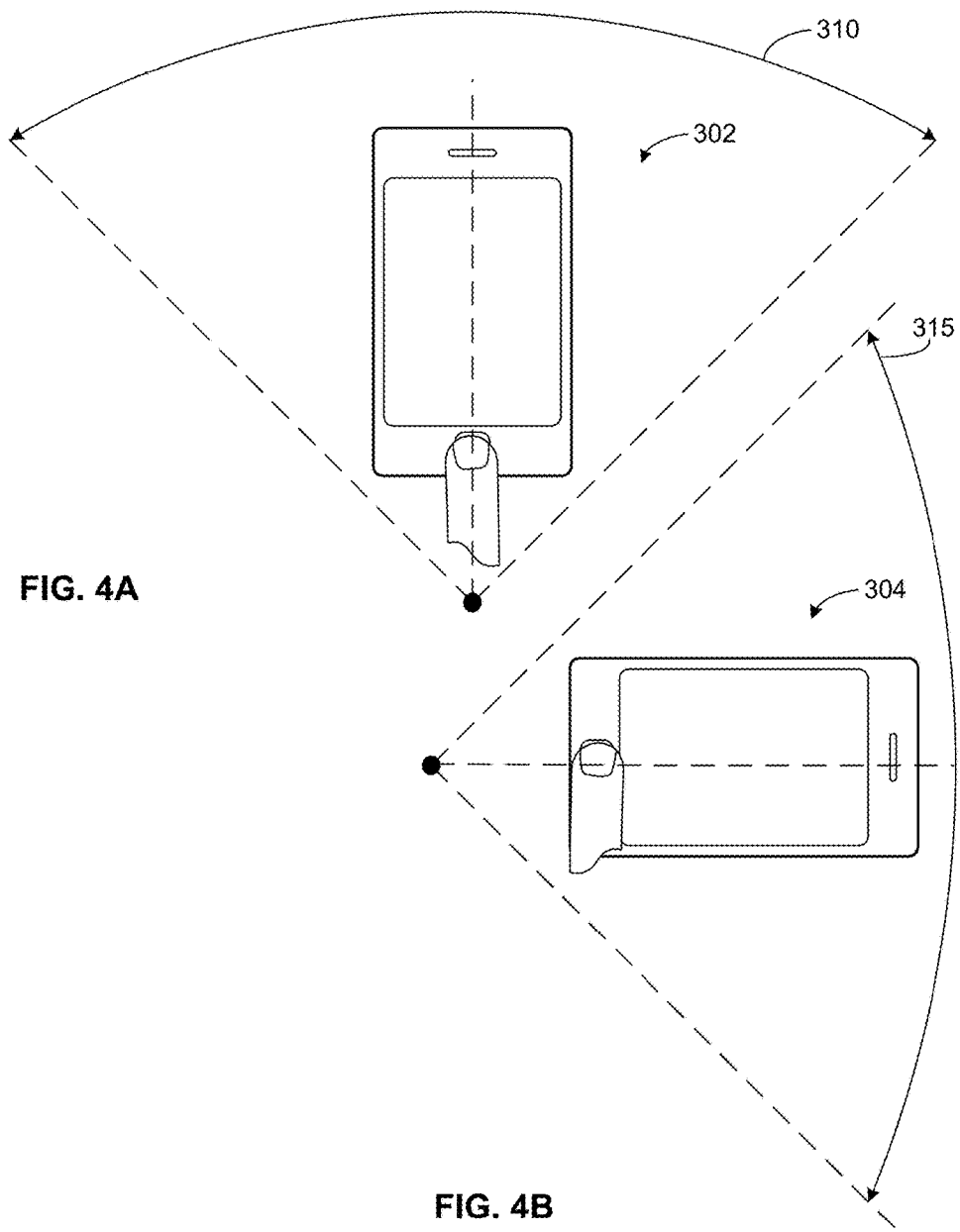
FIG. 4A is a schematic diagram of the example portable electronic device of FIG. 1 positioned in a first (upright vertical) orientation relative to a user.
FIG. 4B is a schematic diagram of the example portable electronic device of FIG. 1 positioned in a second (left side up, horizontal) orientation relative to a user.
Figure 4C:
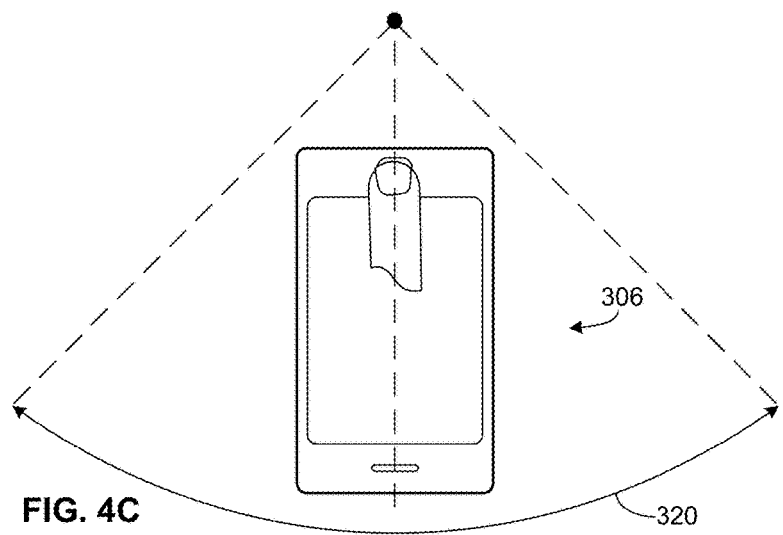
FIG. 4C is a schematic diagram of the example portable electronic device of FIG. 1 positioned in a third (upside down, vertical) orientation relative to a user.
Figure 4D:
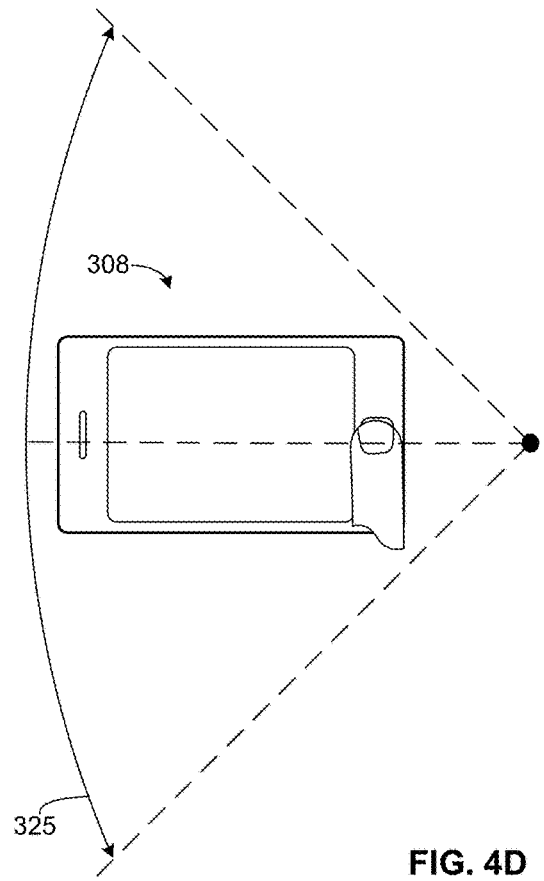
FIG. 4D is a schematic diagram of the example portable electronic device of FIG. 1 positioned in a fourth (right side up, horizontal) orientation relative to a user.
Figure 6A:
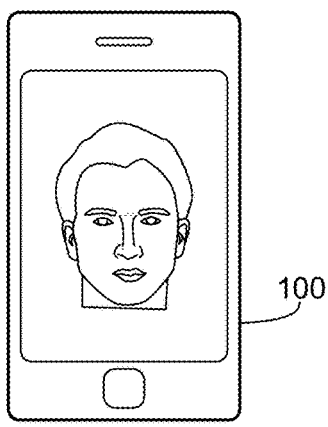
FIG. 6A is a schematic diagram of the example portable electronic device of FIG. 2 positioned in a first orientation relative to a user.
Figure 6B:
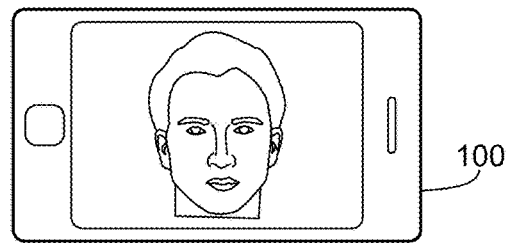
FIG. 6B is a schematic diagram of the example portable electronic device of FIG. 1 positioned in a second orientation relative to a user.
Figure 6C:
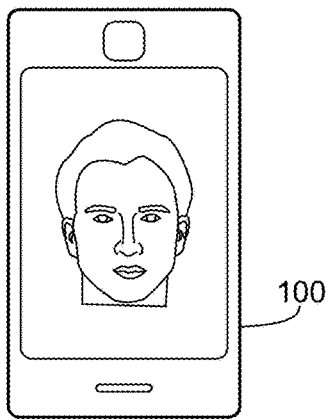
FIG. 6C is a schematic diagram of the example portable electronic device of FIG. 1 positioned in a third orientation relative to a user.
Figure 6D:
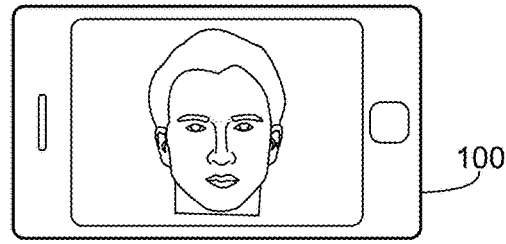
FIG. 6D is a schematic diagram of the example portable electronic device of FIG. 1 positioned in a fourth orientation relative to a user.

FIG. 3 illustrates four schematic diagrams of the example portable device 100 shown in four example orientations. In some examples, the display device/screen 104, the example fingerprint sensor 110, the example speaker 126, and the example image sensor 112 are disposed on a face of the portable device 100. Further, the fingerprint sensor 110 also operates as an input button that can be pressed by the user to provide input to the portable electronic device 100. A first device orientation/position 302 is an upright orientation. When in the upright orientation, the height of the portable device 100 is longer than the width of the portable device 100. In this orientation, a first side (side 1) of the portable device 100 is on the bottom, a second side (side 2) of the portable device 100 is on the right, a third side (side 3) is on the top, and a fourth side (side 4) is on the top. In some examples, the first orientation/position 302 includes any rotation of the device from the vertical upright position to a rotated position lying within a first arc 310 extending between 225° and 315°. A second orientation 304 is a horizontal orientation. When in the second orientation, the width of the portable device 100 is longer than the height of the portable device 100 and the portable device 100 is rotated 90 degrees in a clockwise direction relative to the first orientation. Thus, the first side (side 1) of the portable device 100 is on the left in the second orientation, the second side (side 2) is on the bottom, the third side (side 3) is on the right, and the fourth side (side 4) is on the top. In some examples, the second orientation/position 304 includes any rotation of the portable device 100 along a second arc 315 extending between 315° and 45°. A third orientation 306 is an upside down orientation in which the height of the portable device 100 is longer than the width of the portable device 100 and the portable device 100 is turned upside down relative to the first orientation. In the third orientation 306, the first side (side 1) of the portable device is on the top, the second side (side 2) is on the left, the third side (side 3) is on the bottom, and the fourth side (side 4) is on the right. In some examples, the third orientation/position 306 includes any rotation of the portable device 100 along a third arc 320 extending from 45° to 135°. A fourth orientation 308 is a horizontal position in which the width of the device is longer than the height of the portable device 100 and the portable device 100 is rotated 90 degrees from the third orientation in a clockwise direction. In the fourth orientation 308, the first side (side 1) of the portable device 100 is on the right, the second side (side 2) is on the top, the third side (side 3) is on the left, and the fourth side (side 4) is on the bottom. In some examples, the fourth orientation/position 306 includes any rotation of the portable device 100 along a fourth arc 325 extending between 135° and 225°.

During the biometric training data collection process, the prompts generated by the biometric training data builder 210 instruct the user to place the portable electronic device 100 in the first orientation 302 and to place the user's finger on the fingerprint sensor 110 when in this orientation. FIGS. 4A, 4B, 4C and 4D illustrate the example portable electronic device 100 occupying each of the first, second, third and fourth orientations 302, 304, 306, 308, respectively, and the placement of a user's finger on the example fingerprint sensor 110 disposed on the face of the portable electronic device 100. In some such examples, a first prompt generated by the training data builder 210 instructs the user to place the portable electronic device 100 in the first orientation 302 and to place the user's finger on the button in a same orientation as the user will place the finger when using the portable device 100 in the first orientation. The biometric training data builder 210 then collects the fingerprint (biometric sample) that is sensed when the user's finger is placed on the fingerprint sensor/input button 110 while holding the portable electronic device in the first orientation 302 (see FIG. 4A). In some examples, to account for the rotation of the device, the training data builder 210 instructs the user to rotate the portable device 100 to various positions located within the first, second, third, and fourth arcs 310, 315, 320 and 325 and collects fingerprints at each of the positions. In some examples, the biometric sample is collected from the user when the device is held in one orientation (e.g., the first orientation) and the training data builder 210 correlates the collected biometric sample to the first orientation. In addition, in some such examples, the training data builder 210 then uses the collected biometric sample to derive a set of biometric samples corresponding to the other orientations. For example, the training data builder 210 rotates the collected biometric sample to each of the remaining set of orientations/positions and saves the rotated biometric samples in each such orientation and saves a corresponding orientation identifier.

Referring also to FIG. 5, which illustrates an example biometric training data set 500, the example biometric training data builder 210 (see FIG. 2) causes the fingerprint to be stored in the example biometric data storage 304 as a first biometric data set 502 and also causes a first device orientation identifier 504 to be associated with the first biometric data set in the biometric data storage 204. In some examples, the training data builder 210 also causes the example biometric data processor 202 (see FIG. 2) to process the first-collected fingerprint. The biometric data processor 202 is configured to process the collected biometric data (e.g., the fingerprint) by extracting features (e.g., f1, f2, f3) from the biometric data that is stored in the corresponding biometric data set. The extracted features (f1, f2, f3) are then stored as part of the corresponding biometric data set 502. The features (f1, f2, f3) to be extracted by the biometric data processor 304 are dependent on the type of biometric data collected (e.g., features extracted from a fingerprint may be related to the pattern of the fingerprint, features extracted from a facial image may be related to the distance between aspects of the face appearing in a facial image, etc.). In some such examples, the example biometric training data builder 210 generates a second prompt instructing the user to place the example portable electronic device 100 in the second orientation 302 (see FIG. 4B) and to place the user's finger on the fingerprint sensor/input button 110 (see FIG. 1) in a finger position/orientation in which the user will place the finger when pressing the button during normal operation (see FIG. 4B). The user again responds by following the instructions and a second biometric data set 506 corresponding to the second orientation is collected. The biometric training data builder 210 causes a second device orientation identifier 508 to be associated with the second biometric data set 508 in the biometric data storage 204. The biometric training data builder 210 continues in this fashion until biometric data sets 512, 514 corresponding to each of the third and fourth orientations 306, 308 (see FIG. 4C and FIG. 4D) have been collected, processed and associated with corresponding device orientation identifiers 514, 516, thereby resulting in a fully populated biometric training data set 500. In some examples, a user may employ a different finger to generate the biometric data sets 502, 506, 510, 512 corresponding to different orientations 302, 304, 306, 308 depending on whether the user will employ a different finger to operate the portable electronic device 100 when the portable electronic device 100 is positioned in the different orientations 302, 304, 306, 308.

FIGS. 6A, 6B, 6C and 6D illustrate the example portable electronic device 100 occupying each of the first, second, third and fourth orientations 302, 304, 306, 308, respectively, and a corresponding facial image captured on the display while the user is holding the portable electronic device 100 in the corresponding orientation. In some examples, any of the first, second and third biometric sensors 110, 112, 114 may be implemented as an image sensor and the biometric samples used to build the biometric data set 500 (see FIG. 5) constitute a set of facial images. In some such examples, the prompts generated by the example biometric training data builder 210 instruct the user to hold the portable electronic device 100 in each of the set of first, second, third and fourth orientations 302, 304, 306, 308. The prompts may further instruct the user to provide an alert signal when the portable electronic device 100 is placed in the appropriate orientation by selecting an input (e.g., pressing the fingerprint sensor/input button 110, touching the display/touch screen 104, etc.). When the alert signal is received, the biometric training data builder 210 actuates the image sensor/camera 112 disposed on the face/front of the portable electronic device 100. The image captured during sensor actuation is then stored as (at least part of) the first, second, third or fourth biometric data set 502, 506, 510, 512 corresponding to the orientation in which the portable electronic device 100 is positioned at the time of image capture.

After the biometric training data set 500 is populated, the biometric-based orientation controller 102 begins controlling the orientation of information presented on the example display device 104. In some examples, the example orientation determination tool 206 receives input data (e.g., biometric samples) from the first, second and/or third biometric inputs 110, 112, 114 and from the biometric data storage 204 (e.g., biometric data sets, device orientation identifiers). The orientation determination tool 206 uses the received data to determine a device orientation. In some examples, the orientation determination tool 206 determines the device orientation associated with a biometric sample by comparing a biometric input sample received from one of the first, second or third biometric sensors 110, 112, 114 to a first biometric data set stored in the biometric data storage 204. If the first biometric data set matches the biometric sample, then a device orientation identifier associated with the first biometric data set is extracted from the biometric data storage. For example, if the first biometric data set 502 (see FIG. 5) is associated with the first orientation, then the corresponding device orientation identifier will identify the first orientation. If the first biometric data set 502 does not match the biometric sample, then the orientation determination tool 206 compares the biometric sample to a second biometric data set 504 (see FIG. 5) stored in the biometric data storage 204, and so forth, until the biometric sample has been compared to all of the biometric data sets 502, 506, 510, 512 and a match is found. In some examples, the orientation determination tool 206 causes the biometric sample to be processed by the biometric data processor 202 before comparing the biometric sample to the biometric training data 500. In some such examples, the biometric data processor 202 processes the biometric sample by extracting relevant features from the biometric sample. The orientation determination tool 206 then compares the features extracted from the biometric sample to the features included in the biometric data sets 502, 506, 510, 512 until a match is identified.

The example orientation determination tool 206 transmits the device orientation identifier corresponding to the matching biometric data set to the example orientation adjustment tool 208 via the example communication bus 312. The orientation adjustment tool 208 compares the device orientation identifier to a content orientation identifier that represents an orientation at which information is currently being presented on the example display device 104. In some examples, the orientation adjustment tool 208 obtains the content orientation identifier from the position/input-based orientation controller 108 (see FIG. 1), as described above. If the comparison yields a match, then the display device 104 is currently presenting information in the same orientation as the example portable electronic device 100 is positioned. As a result, the orientation adjustment tool 208 does not adjust the content orientation. If the comparison does not yield a match, then the display device 104 is currently presenting information in an orientation that is different from the device orientation. In response to finding a mismatch, the orientation adjustment tool 208 changes the content orientation to be the same as the device orientation. In some examples, the orientation adjustment tool 208 changes/adjusts the content orientation by transmitting the device orientation identifier to the example position/input-based orientation controller 108 (see FIG. 1). Upon receiving the device orientation identifier, the position/input-based orientation controller 108 changes the content orientation to match the orientation represented by the device orientation identifier.

The example portable electronic device 104 (see FIG. 1) having the biometric-based orientation controller 102 (see FIG. 1 and FIG. 2) disclosed herein may be implemented as a portable telephone, a tablet device, a gaming device, a hybrid laptop/tablet device and/or as any other portable device having a display/screen on which information is presented for display. The example portable electronic device 104 disclosed herein includes the example position/input-based orientation controller 108 (see FIG. 2). As a result, the portable electronic device 100 can rely on either (or a combination) of position/input-based and/or orientation-based control of information to be presented on the display. Such features could be left to the selection of the user in a setting menu. In addition, the portable electronic device 104 may instead be implemented without a position/input-based orientation controller 108. In some such examples, the portable device 104 would rely solely on the orientation-based controller 102 to control the orientation of information presented on the display device 104. Further, in some such examples, the orientation-based controller 102 would be configured to receive the information to be presented for display from the example display device controller 106, to properly orient the information for display based on biometric information, and to supply the properly oriented information to the example display device 104.

The example first, second and third biometric sensors 110, 112, 114 may be implemented using any sensor capable of sensing biometric data fingerprint sensor, an image sensor/camera, a voice sensor, a body temperature sensor, etc. Further, the example biometric data processor 202 can be configured to process/analyze image data, voice data, temperature data, fingerprint data and, indeed, any biometric data supplied by the first, second and third biometric sensors 110, 112, 114. Further the example orientation determination tool 206 can be configured to perform any facial recognition algorithm, voice recognition algorithm, fingerprint matching algorithm, temperature algorithm, needed to compare and find matches to the biometric data samples collected from the user. In some examples, in which any of the first, second or third biometric sensors 110, 112, 114 are configured to include microphones and a voice recognition algorithm, the biometric training data sets may include the user's voice pattern as the user speaks words representing the first orientation, the second orientation, the third orientation, and the fourth orientation.

While an example manner of implementing the portable electronic device 100 is illustrated in FIG. 1 and an example manner of implementing the biometric-based orientation controller 102 is illustrated in FIG. 2, one or more of the elements, processes and/or devices illustrated in FIG. 1 and FIG. 2 may be combined, divided, re-arranged, omitted, eliminated and/or implemented in any other way. Further, the example display device 104, the example display device controller 106, the example position/input based-orientation controller 108, the example first biometric sensor 110, the example second biometric sensor 112, the example third biometric sensor 114, the example position/motion sensor 116, the example processor 118, the example input device(s) 120, the example communication device(s) 122, the example memory device(s) 124, the example speaker 126, the example first communication bus 128, the example biometric data processor 202, the example biometric data storage 204, the example orientation determination tool 206, the example orientation adjustment tool 208, the example training data builder 210, the example second communication bus 212 and/or, more generally, the example portable electronic device of FIG. 1 and/or more generally the biometric-based orientation controller 102 of FIG. 1 and FIG. 2 may be implemented by hardware, software, firmware and/or any combination of hardware, software and/or firmware. Thus, for example, any of the example display device 104, the example display device controller 106, the example position/input based-orientation controller 108, the example first biometric sensor 110, the example second biometric sensor 112, the example third biometric sensor 114, the example position/motion sensor 116, the example processor 118, the example input device(s) 120, the example communication device(s) 122, the example memory device(s) 124, the example speaker 126, the example first communication bus 128, the example biometric data processor 202, the example biometric data storage 204, the example orientation determination tool 206, the example orientation adjustment tool 208, the example training data builder 210, the example second communication bus 212 and/or, more generally, the example portable electronic device of FIG. 1 and/or more generally the biometric-based orientation controller 102 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the example portable electronic device 100, the biometric-based orientation controller 102, the example display device 104, the example display device controller 106, the example position/input based-orientation controller 108, the example first biometric sensor 110, the example second biometric sensor 112, the example third biometric sensor 114, the example position/motion sensor 116, the example processor 118, the example input device(s) 120, the example communication device(s) 122, the example memory device(s) 124, the example speaker 126, the example first communication bus 128, the example biometric data processor 202, the example biometric data storage 204, the example orientation determination tool 206, the example orientation adjustment tool 208, the example second communication bus 212, and the example training data builder 210 is/are hereby expressly defined to include a tangible computer readable storage device or storage disk such as a memory, a digital versatile disk (DVD), a compact disk (CD), a Blu-ray disk, etc. storing the software and/or firmware. Further still, the example portable electronic device 102 of FIG. 1 and the example biometric-based orientation controller 102 of FIG. 2 may include one or more elements, processes and/or devices in addition to, or instead of, those illustrated in FIG. 1 and FIG. 2 and/or may include more than one of any or all of the illustrated elements, processes and devices.

Figure 7:
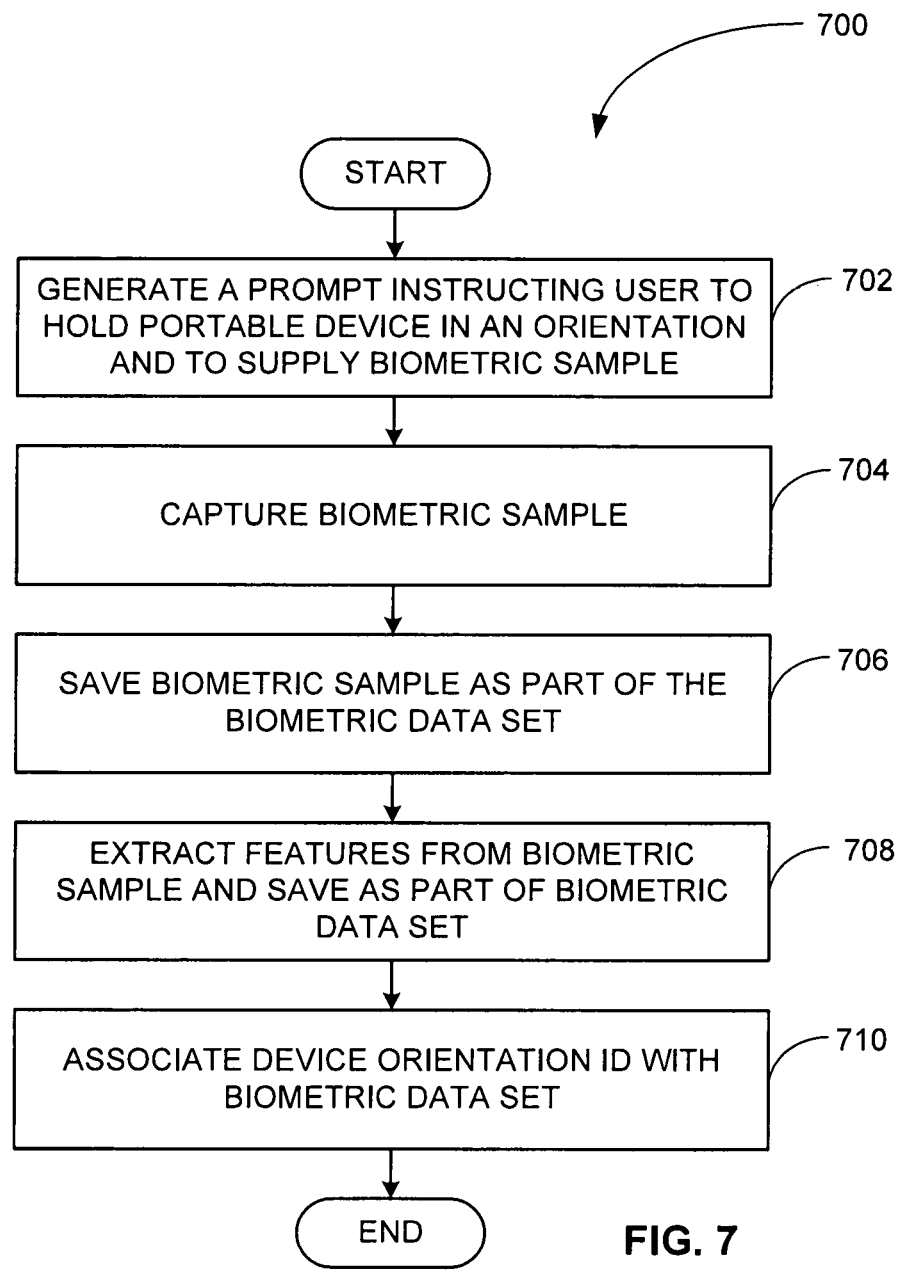
FIG. 7 is an example flow chart representative of example machine readable instructions which may be executed to implement the example biometric-based orientation controller of FIG. 2.
Figure 8:
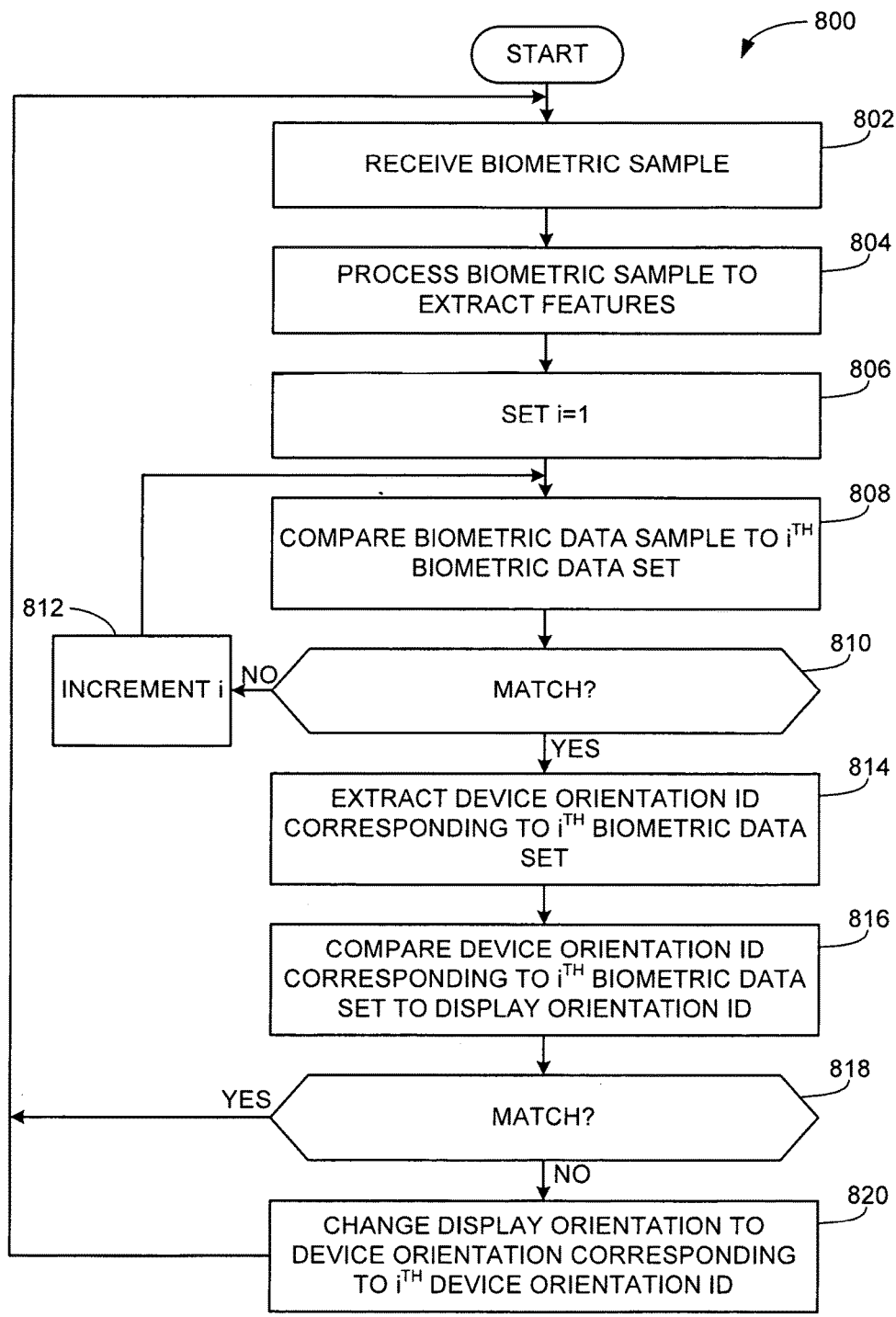
FIG. 8 is a flow chart representative of example machine readable instructions which may be executed to implement the example biometric-based orientation controller of FIG. 2.
Figure 9:
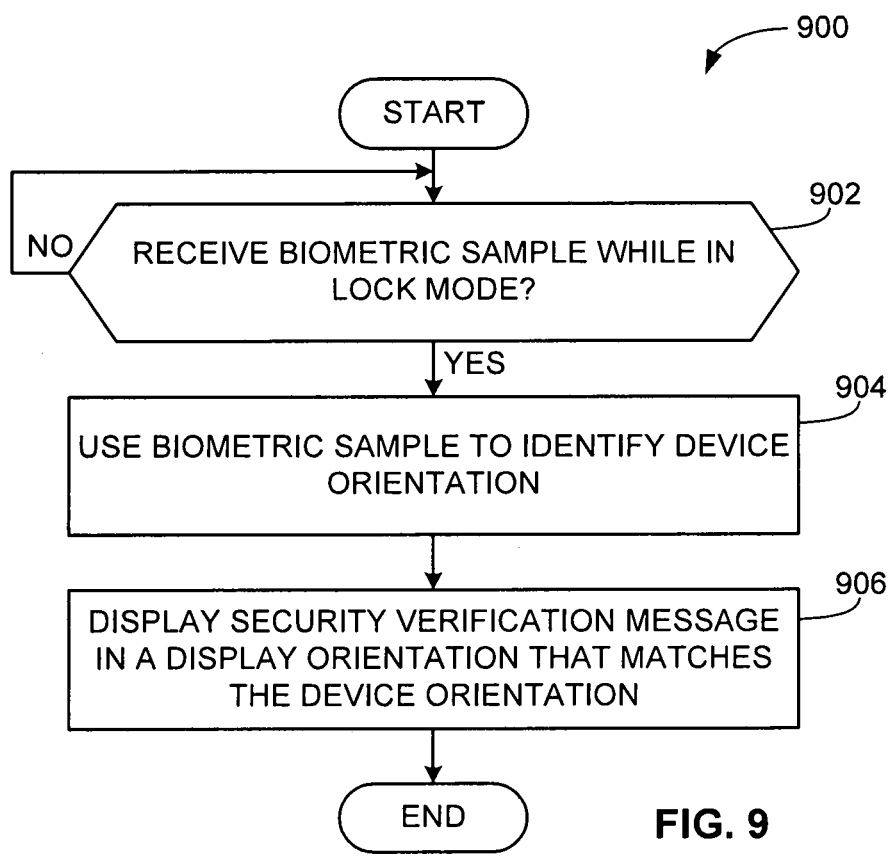
FIG. 9 is a flow chart representative of example machine readable instructions which may be executed to implement the example portable electronic device having an example biometric-based orientation controller of FIG. 1 and FIG. 2.

Flowcharts representative of example machine readable instructions for implementing the example portable electronic device 100 of FIG. 1 and the biometric-based orientation controller 102 of FIG. 2 are shown in FIGS. 7, 8 and 9. In these examples, the machine readable instructions comprise a program(s) for execution by a processor such as the processor 118 shown in the example processor platform 1000 discussed below in connection with FIG. 10. The program(s) may be embodied in software stored on a tangible computer readable storage medium such as a CD-ROM, a floppy disk, a hard drive, a digital versatile disk (DVD), a Blu-ray disk, or a memory associated with the processor 118, but the entire program and/or parts thereof could alternatively be executed by a device other than the processor 118 and/or embodied in firmware or dedicated hardware. Further, although the example program is described with reference to the flowcharts illustrated in FIGS. 7-9, many other methods of implementing the example portable electronic device 100 of FIG. 1 and the biometric-based orientation controller 102 of FIG. 2 may alternatively be used. For example, the order of execution of the blocks may be changed, and/or some of the blocks described may be changed, eliminated, or combined.

As mentioned above, the example processes of FIGS. 7, 8 and 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably.

Additionally or alternatively, the example processes of FIGS. 7, 8, and 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

The program 700 of FIG. 7 provides example operations performed by the example biometric orientation-based controller 100 of FIG. 1 and FIG. 2 and begins at block 702 at which the example training data builder 210 (see FIG. 2) generates a prompt instructing a user to hold the portable electronic device 100 (see FIG. 1) in one of the possible orientations (e.g., the first orientation 302 (see FIG. 3), the second orientation 304 (see FIG. 3), the third orientation 306 (see FIG. 3), the fourth orientation 308 (see FIG. 3), etc.) and instructs the user to supply a biometric sample while holding the portable device 100 in the orientation. In some examples, the training data builder 210 generates the prompt in response to a signal from the example processor 118 (see FIG. 1). In some examples, the processor 118 sends the signal and additionally informs the training data builder 210 as to the user's preferences regarding which of the example set of first, second and third biometric sensors 110, 112, 114 are to be used to build the biometric training data. In some examples, the processor 118 sends the signal and informs the training data builder 210 that the user has elected to activate the training data builder 210 but does not supply information regarding the user's preferred biometric sensor. In some such examples, before the training data builder 210 generates the prompt instructing the user to hold the portable electronic device in an orientation, the training data builder 210 generates a prompt identifying all available sensors (e.g., the first, second and third biometric sensors 110, 112, 114) that may be used to control content orientation. The user can then select one of the biometric sensors 110, 112, 114 and the training data builder 210 proceeds to generate prompts/instructions based on the user's selection (e.g., if the fingerprint sensor 110 is selected, prompts having instructions to provide a fingerprint are generated, if the image sensor 112 is selected, prompts having instructions to provide an image are generated, etc.). In some examples, the user's ability to control the content orientation using biometric information is included in a menu of device settings that the user can turn on or off based on the user's preferences.

After the prompt to supply biometric data while holding the device in an orientation is generated, the selected one of the example first, second and third biometric sensors 110, 112, 114 captures the biometric data and supplies the biometric data to the example training data builder 210 (block 704). The training data builder 210 stores the biometric data in the example biometric data storage 204 (see FIG. 2) as the first biometric data set 502 (see FIG. 5) (block 706) and causes the example biometric data processor 202 (see FIG. 2) to extract features from the biometric data which are also stored as part of the biometric data set 502 (block 708). In addition, the training data builder 210 causes a device orientation identifier 504 corresponding to the orientation of the device at the time of biometric data capture to be associated with the biometric data set in the biometric data storage (block 710) and the program 700 ends. The training data builder 210 repeats the program 700 for each possible orientation of the portable electronic device until the biometric training data set 500 is fully populated (e.g., biometric data has been collected for all possible orientations).

The program 800 of FIG. 8 provides example operations performed by the example orientation-based controller 102 of FIG. 1 and FIG. 2 and begins at block 802 at which the example orientation determination tool 206 (see FIG. 2) receives input data (e.g., biometric samples) from the first, second and/or third biometric inputs 110, 112, 114 and from the biometric data storage 204 (e.g., biometric data sets 502, 506, 510, 512, device orientation identifiers 504, 508, 514, 516). The orientation determination tool 206 causes the biometric sample to be processed by the biometric data processor (block 804). In some examples, the biometric data processor processes the biometric sample by extracting relevant features from the biometric sample. After the biometric sample has been processed, a counter i is set to 1 (i=1) (block 806). After the counter i, has been set, the orientation determination tool 206 compares the biometric sample (and the features extracted therefrom) to the ith biometric data set stored in the example biometric data storage 204 (see FIG. 2) (block 808). Next, the orientation determination tool 206 determines whether the ith biometric data set matches the biometric sample (block 810). If the ith biometric data set does not match the biometric sample, the orientation determination tool 206 increments the counter i (block 812) and then compares the biometric sample to another biometric data set (e.g., the ith biometric data set) (block 808), as described above. If a match has been found, then a device orientation associated with the ith biometric data set is extracted from the biometric data storage (block 814). The orientation adjustment tool 208 then compares the extracted device orientation identifier to a content orientation identifier (block 816). As described above, the content orientation identifier can be supplied by the example position/input-based orientation controller 108 (see FIG. 1) and identifies a content orientation at which the display is currently presenting information/data. If the comparison yields a match (block 818), the example display device 104 (see FIG. 1) is presenting information/data in an orientation that aligns with an orientation of the portable electronic device 100 such that no adjustment is needed and the program returns to the block 802 and waits for another biometric sample to be received. If the comparison does not yield a match, the display device 104 is presenting information/data in an orientation that does not align with an orientation of the portable electronic device 100. As a result, the orientation adjustment tool 208 causes the content orientation to be adjusted/changed to match the device orientation. In some examples, the adjustment is made by transmitting the device orientation identifier to the position/input-based orientation controller 108. Upon receiving the device orientation identifier, the position/input-based orientation controller 108 changes the content orientation to match the orientation represented by the device orientation identifier. Next, the program returns to the block 802 at which the orientation determination tool 206 awaits receipt of a next biometric sample as described above. The program 800 continues to execute in the manner described, thereby processing incoming biometric samples and making adjustment so the content orientation, as needed.

The program 900 of FIG. 9 provides example operations performed by the example portable electronic device 100 (see FIG. 1) when the portable electronic device 100 is in a locked mode and the display device/screen is dark. The program 900 begins at block 902 at which the example orientation determination tool 206 determines whether input data (e.g., a biometric sample) has been received from one of the first, second or third biometric sensors 110, 112, 114 (see FIG. 1). If a biometric sample is not yet received, the orientation determination tool 206 returns to the block 902 and again determines whether a biometric sample has been received. In this example, the biometric sample is received, the orientation determination tool 206 uses the biometric sample to obtain a device orientation identifier which is supplied to the orientation adjustment tool 208 for use in adjusting, if needed, the content display orientation (block 904). The portable electronic device 100 then causes the display device to present a security verification message (e.g., unlock screen) in an orientation that matches the content display orientation corresponding to the device orientation (block 906) and the program 900 ends. Based on the operation of program 900, when the portable electronic device enters a locked mode, the security verification message is displayed in an orientation that is aligned with the orientation of the portable electronic device 100 at the time the user attempts to unlock the portable electronic device 100. Thus, the need for the user to manually change the orientation of the portable electronic device 100 until a security verification code can be entered is eliminated. In some examples, an internal gyroscope included in the motion/position sensors 116 determines the device orientation at the block 904 and the security verification message is presented in an orientation that matches the device orientation at the block 906. In some examples, the security verification message is a simple unlock screen into which the user can enter a numeric (or any other type) code. In some examples, the security verification message is simply a user interface display. In such examples, the user is presented with a user interface that matches the device orientation when the device powers on, instead of a user interface that is otherwise oriented.

Figure 10:
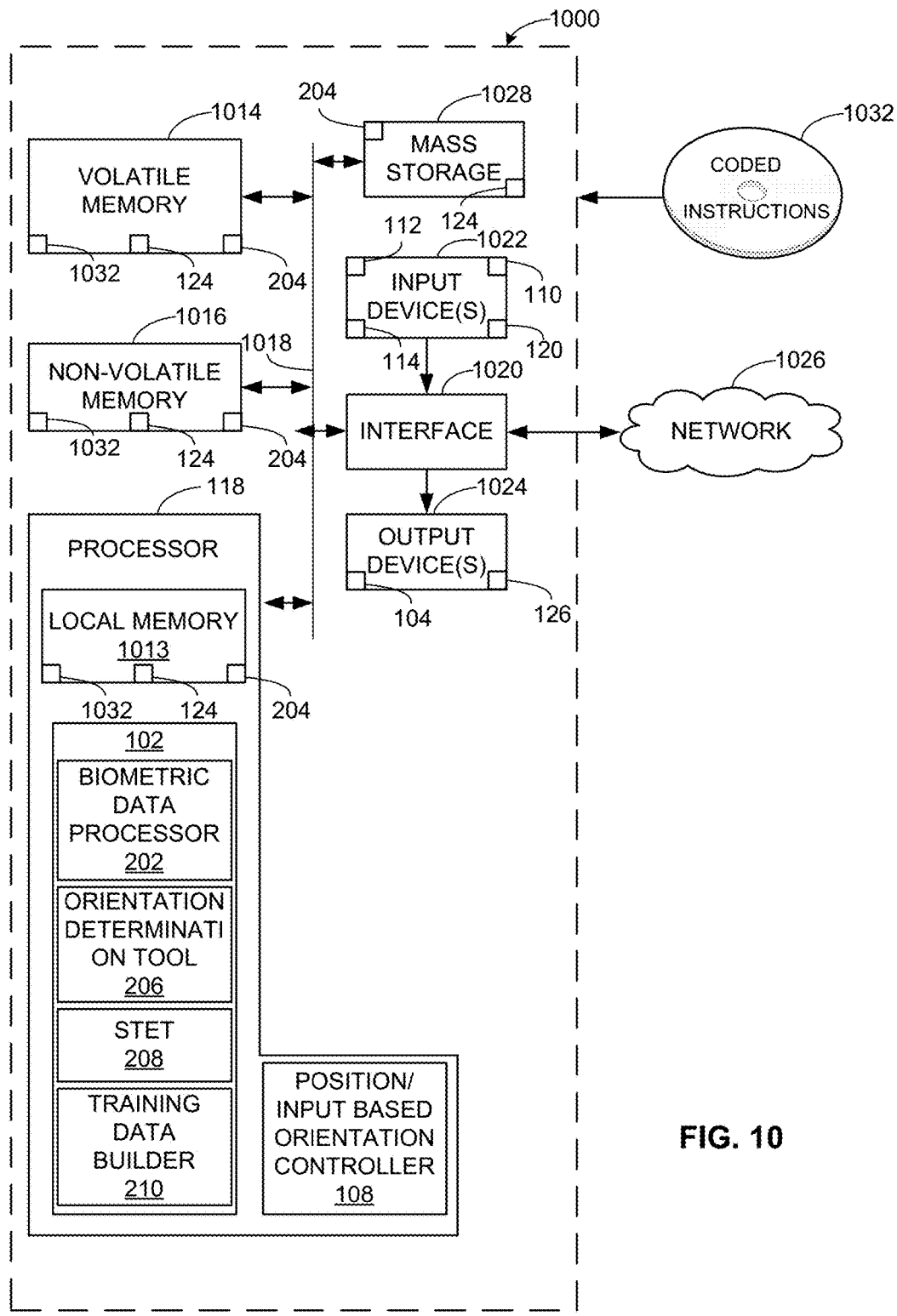
FIG. 10 is a block diagram of an example processor platform capable of executing the instructions of FIGS. 7, 8 and/or 9 to implement the example portable electronic device and the example orientation-based controller of FIGS. 1 and 2.

FIG. 10 is a block diagram of an example processor platform 1000 capable of executing the instructions of FIGS. 7-9 to implement the portable electronic device 100 of FIG. 1. The processor platform 1000 of the illustrated example includes a processor 118. The processor 118 of the illustrated example is hardware. For example, the processor 118 can be implemented by one or more integrated circuits, logic circuits, microprocessors or controllers from any desired family or manufacturer. In some examples, the processor 118 can be used to implement the example processor 118 (see FIG. 1), the example position/input-based orientation controller 108 (see FIG. 1), the example display device controller 206 (see FIG. 2), the example biometric data processor 202 (see FIG. 2), the example biometric-based controller 102 (see FIG. 2), the example orientation adjustment tool 208 (see FIG. 2), the example biometric training data builder 210 (see FIG. 2), the example orientation determination tool 206, and the example biometric data processor 202 (see FIG. 2).

The processor 118 of the illustrated example includes a local memory 1013 (e.g., a cache). The processor 118 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller. In some examples, the volatile memory 1014, and the non-volatile memory 1016 can be used to implement the example memory devices 124 (see FIG. 1) and the example biometric data storage 204 (see FIG. 2).

The processor platform 1000 of the illustrated example can also include an interface circuit 1020. The interface circuit 1020 may be implemented by any type of interface standard, such as an Ethernet interface, a universal serial bus (USB), and/or a PCI express interface. In some examples, the interface circuit can be used to implement the example first communication bus 128 (see FIG. 1) or the example second communication bus 212.

In the illustrated example, one or more input devices 1022 are connected to the interface circuit 1020. The input devices 1022 can be used to implement any of the example input devices 120, the example first, second, and third biometric sensors 110, 112, 114, and the display/touch screen 104.

One or more output devices 1024 can also be connected to the interface circuit 1020 of the illustrated example. The output devices 1024 can be implemented, for example, by display devices (e.g., a light emitting diode (LED), an organic light emitting diode (OLED), a liquid crystal display, emitting diode (LED). The interface circuit 1020 of the illustrated example, thus, typically includes a graphics driver card, a graphics driver chip or a graphics driver processor. The output devices 1024 can be used to implement the example display/touch screen 104 (see FIG. 1) and the example speaker 126.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, a low power wireless area network, etc.). In some examples, the example interface circuit 1020 can be used to implement the example communication devices 122 (see FIG. 2).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives. In some examples, the mass storage device 1028 can be used to implement the example memory devices 124 and the example biometric data storage 204.

The coded instructions 1032 of FIGS. 7-9 may be stored in the mass storage device 1028, in the volatile memory 1014, in the non-volatile memory 1016, and/or on a removable tangible computer readable storage medium such as a CD or DVD.

From the foregoing, it will appreciated that methods, apparatus, and articles of manufacture that have been disclosed herein provide the biometric-based control of an orientation in which content/information is presented on a display device. The example methods, apparatus and articles of manufacture disclosed herein are used to change the orientation of information presented on the display device using biometric data collected from a user. Example methods, systems, apparatus and articles of manufacture disclosed herein provide a variety of advantages. For example, some such methods, apparatus and articles of manufacture enhance a user's interactions with a portable device by providing a more stable and accurate method of tracking changes in the orientation of the device which then results in better control of the orientation of information presented on a display. As a result, the user need not wait until a position or motion sensor within the portable device detects a change in position before a content orientation will be adjusted, but can instead supply a fingerprint, a spoken word, or another piece of biometric data. In some instances, for example, when fingerprints are used to control the orientation, the user need not take any additional steps to supply biometric data to effect control of the orientation as the fingerprint is supplied each time the user touches an input button. In some instances, for example, when facial images are used to control the device, the user need not take any additional action to supply biometric data as the camera can be configured to automatically scan the user's face to determine the orientation of the device relative to the user. Further, in some examples, the portable device 100 can be configured to include both position/motion sensors and biometric sensors. In some such examples, the position/motion sensor may be configured to supply a signal to the biometric-based orientation controller 102 whenever any movement is detected. In response, the biometric-based orientation controller 102 can be configured to detect the facial image of the user and subsequently use the image to determine whether the orientation of the display needs to be changed. In some such examples, the biometric-based orientation controller 102 can cause a prompt to be displayed on the display device 104 instructing the user to supply a fingerprint. The biometric-based orientation controller 102 can then use the fingerprint to determine whether the orientation of the display needs to be changed. Thus, the biometric-based orientation controller 102 disclosed herein can supplement the orientation control provided by the position/input-based orientation controller 108. Moreover, the biometric-based orientation tool 102 disclosed herein can be used when a portable device is in a lock mode wherein the contents of the device are not accessible to the user. As a result, when the user presses a button to unlock the portable electronic device, the user's fingerprint is detected and used to determine whether any adjustments to the content orientation are needed. In some examples, the adjustment is made before a security verification message is displayed such that the security verification message appears in an orientation that matches the device orientation. Further, biometric-based orientation methods disclosed herein enhance the user's interaction with the portable electronic device by eliminating the need for the user to move the portable device into an orientation that matches a content orientation and also eliminating the need or to periodically jiggle the portable electronic device to activate position/motion sensors. In addition, biometric-based orientation controllers disclosed herein can also be used to authenticate the identity of the user based on the collected biometric data, thereby eliminating the need for the user to enter a security code when attempting to unlock a portable device.

A plurality of example methods, apparatus, and articles of manufacture are disclosed herein. Example no. 1 is a portable electronic device having a display device, a biometric sensor to capture a biometric sample, and an orientation determination tool. The orientation determination tool is to determine a device orientation of at least one of the display device and the portable electronic device relative to a user based on the biometric sample. The portable electronic device of Example no. 1 also includes an orientation adjustment tool to change a content orientation in which the display device of the portable electronic device presents content based on the determination of the device orientation of the at least one of the display device and the portable electronic device.

Example no. 2 is the portable electronic device of Example no. 1, wherein the biometric sensor is at least one of a fingerprint sensor or an image sensor.

Example no. 3 is the portable electronic device of Example no. 1, wherein the portable electronic device is at least one of a portable telephone or a hybrid tablet/laptop device.

Example no. 4 is the portable electronic device of Example no. 1, wherein the biometric sensor is to capture the biometric sample in response to an input command to activate the display device of the portable electronic device.

Example no. 5 is the portable electronic device of Example No. 1, further including a biometric training tool.

The biometric training tool is to store a plurality of biometric data sets and corresponding device orientation identifiers. In Example no. 5, the orientation determination tool is to determine the device orientation based on a comparison of the biometric sample to at least one of the biometric data sets.

Example No. 6 is the portable electronic device of Example no. 5, wherein the orientation adjustment tool is to store a content orientation identifier representing the content orientation.

Example no. 7 is the portable electronic device of Example no. 6, wherein the orientation adjustment tool is to compare the content orientation identifier to a device orientation identifier. The device orientation identifier corresponds to a matching one of the biometric data sets. In Example no. 7, the orientation adjustment tool is to change the content orientation when the content orientation identifier does not match the device orientation identifier.

Example no. 8 is a method to change a content orientation in which a display device presents content based on biometric information and includes capturing, with a biometric sensor, a biometric sample, and comparing, with at least one processor executing an instruction, the biometric sample to a stored biometric data set. The biometric data set corresponds to a portable device orientation. The method of Example no. 8 also includes changing the content orientation, based on the comparing of the biometric sample to the biometric data set.

Example no. 9 is the method of Example no. 8 wherein the biometric data set is a first biometric data set. The method further includes capturing a plurality of biometric data sets associated with respective ones of a plurality of portable device orientations, and storing the plurality of biometric data sets in association with a plurality of portable device orientation identifiers identifying the respective ones of the plurality of portable device orientations.

Example no. 10 is the method of Example no. 9, further including prompting a user to enter a first biometric data set of the plurality of biometric data sets while holding the portable electronic device in a first portable device orientation relative to the user.

Example no. 11 is the method Example no. 9, wherein comparing of the biometric sample to the biometric data set includes identifying a first biometric data set of the plurality of biometric data sets. The first biometric data set matches the biometric sample, the method also includes storing a first portable device orientation identifier corresponding to the first biometric sample as a current portable device orientation.

Example no. 12 is the method of Example no. 11, wherein the changing of the content orientation includes comparing the current portable device orientation to the content orientation. Further, the method of Example no. 12 also includes, when the current portable device orientation and the content orientation are different, changing the content orientation to match the current portable device orientation.

Example no. 13 is the method of Example no. 8, wherein the content orientation is a first content orientation and the changing of the first content orientation includes changing from the first content orientation to a second content orientation.

Example no. 14 is a tangible machine readable storage medium storing instructions which, when executed, cause a machine to identify a portable device orientation at which a portable device is oriented relative to a user, based on a biometric sample, and compare the portable device orientation to a content orientation at which a display device of the portable electronic device is currently presenting content. The instructions also cause the machine to, based on the comparison of the portable device orientation and the content orientation, change the content orientation.

Example no. 15 is the tangible machine readable storage medium of Example no. 14, wherein the instructions to identify the portable device orientation includes comparing the biometric sample to a plurality of biometric data sets, and identifying a portable device orientation identifier corresponding to the biometric data set that matches the biometric sample.

Example no. 16 is the tangible machine readable storage medium of Example no. 15, wherein comparing the portable device orientation to the content orientation includes comparing the portable device orientation identifier to a content orientation identifier representing the content orientation at a current time.

Example no. 17 is the tangible machine readable storage medium of Example no. 16, wherein the content orientation is changed when the content orientation identifier does not match the portable device orientation identifier.

Example no. 18 is the tangible machine readable storage medium of Example no. 16, wherein the content orientation is not changed when the content orientation identifier matches the portable device orientation identifier.

Example no. 19 is the tangible machine readable storage medium of Example no. 14, wherein the portable device orientation is a first portable device orientation of a plurality of portable device orientations. In Example no. 19, the instructions further cause the machine to prompt a user to supply biometric training data while holding the portable electronic device in a plurality of corresponding portable device orientations including the first portable device orientation, and store at least some features of the biometric training data corresponding to the portable device orientations including the first portable device orientation as corresponding biometric data sets.

Example no. 20 is the tangible machine readable storage medium of Example no. 14, wherein the biometric sensor is at least one of a fingerprint sensor or an image sensor.

Example no. 21 is the portable electronic device of Example 1 or Example 2, wherein the portable electronic device is at least one of a portable telephone or a hybrid tablet/laptop device.

Example no. 22 is the portable electronic device of any of Example nos. 1, 2, or 3, wherein the biometric sensor is to capture the biometric sample in response to an input command to activate the display device of the portable electronic device.

Example no. 23 is the portable electronic device of any of Example nos. 1, 2, 3, or 4, further including a biometric training tool. The biometric training tool is to store a plurality of biometric data sets and corresponding device orientation identifiers. In Example no. 23, the orientation determination tool is to determine the device orientation based on a comparison of the biometric sample to at least one of the biometric data sets.

Example no. 24 is the portable electronic device of any of Example nos. 1, 2, 3, 4, 5, or 6, wherein the orientation adjustment tool is to store a content orientation identifier representing the content orientation.

Example no. 25 is the portable electronic device of Example no. 24, wherein the orientation adjustment tool is to compare the content orientation identifier to a device orientation identifier. In Example no. 25, the device orientation identifier corresponds to a matching one of the biometric data sets, and the orientation adjustment tool is to change the content orientation when the content orientation identifier does not match the device orientation identifier.

Example no. 26 is the method of any of Example nos. 8, 9, 10, and 11, wherein the content orientation is a first content orientation and the changing of the first content orientation includes changing from the first content orientation to a second content orientation.

Example no. 27 is the tangible machine readable storage medium of Example no. 15, wherein comparing of the portable device orientation to the content orientation includes comparing the portable device orientation identifier to a content orientation identifier representing the content orientation at a current time.

Example no. 28 is the tangible machine readable medium of Example no. 16, wherein the content orientation is changed when the content orientation identifier does not match the portable device orientation identifier.

Example no. 29 is the tangible machine readable medium of any of Example nos. 14, 15, 16, 17, 18 or 19, wherein the biometric sensor is at least one of a fingerprint sensor or an image sensor.

Example no. 30 is a machine readable medium including code, when executed, to cause a machine to perform the method of any of Example nos. 8, 9, 10 or 11.

Example no. 31 is a portable electronic device including means to display content, means to capture a biometric sample, means to determine a device orientation of the portable electronic device relative to a user based on the biometric sample, and means to change a content orientation in which the content is displayed based on the determination of the device orientation of the portable electronic device.

Example no. 32 is the portable electronic device of Example no. 31, wherein the biometric sample is at least one of a fingerprint or an image.

Example no. 33 is the portable electronic device of any of Example nos. 31, or 32, wherein the portable electronic device is at least one of a portable telephone or a hybrid tablet/laptop device.

Example no. 34 is the portable electronic device of any of Example nos. 31, or 32, wherein the biometric sample is captured in response to an input command to activate the means to display content.

Example no. 35 is the portable electronic device of any of Example nos. 31, or 32, further including means to store a plurality of biometric data sets and corresponding device orientation identifiers, wherein the means to determine the device orientation of the portable electronic device relative to the user is based on a comparison of the biometric sample to at least one of the biometric data sets.

Example no. 36 is the portable electronic device of Example no. 35, wherein the means to change the content orientation is to compare the content orientation identifier to a device orientation identifier. In Example no. 36, the device orientation identifier corresponds to a matching one of the biometric data sets, and the means to change the content orientation is to change the content orientation when the content orientation identifier does not match the device orientation identifier.

Example no. 37 is a machine-readable storage including machine-readable instructions, when executed, to implement a method or realize an apparatus as claimed in any preceding Example.

Example no. 38 is a portable electronic device including a display device, a biometric sensor to capture a biometric sample, and an orientation determination tool to determine, based on the biometric sample, a first content orientation in which content is presented on the display device relative to a user. The portable device further includes an orientation adjustment tool to change the first content orientation to a second content orientation based on the determination of the first content orientation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A portable electronic device comprising:
   a display device;
   a biometric sensor to capture a biometric sample;
   an orientation determination tool to determine a device orientation relative to a user based on the biometric sample;
   an orientation adjustment tool to change a content orientation in which the display device of the portable electronic device presents content based on the determination of the device orientation; and
   a training data builder to store a plurality of biometric data sets and corresponding device orientation identifiers, the orientation determination tool to determine the device orientation based on a comparison of the biometric sample to at least one of the biometric data sets.

2. The portable electronic device defined in claim 1, wherein the biometric sensor is at least one of a fingerprint sensor or an image sensor.

3. The portable electronic device defined in claim 1, wherein the portable electronic device is at least one of a portable telephone or a hybrid tablet/laptop device.

4. The portable electronic device defined in claim 1, wherein the biometric sensor is to capture the biometric sample in response to an input command to activate the display device of the portable electronic device.

5. The portable electronic device defined in claim 1, wherein the orientation adjustment tool is to store a content orientation identifier representing the content orientation.

6. The portable electronic device defined in claim 5, wherein the orientation adjustment tool is to compare the content orientation identifier to a device orientation identifier, the device orientation identifier corresponding to a matching one of the biometric data sets, and the orientation adjustment tool is to change the content orientation when the content orientation identifier does not match the device orientation identifier.

7. A method to change a content orientation in which a display device presents content based on biometric information, the method comprising:
   prompting a user to enter a plurality of biometric data sets, including a first biometric data set, while holding the portable electronic device in respective ones of a plurality of portable device orientations relative to the user;
   capturing the plurality of biometric data sets, including the first biometric data set; and
   storing the plurality of biometric data sets in association with a plurality of portable device orientation identifiers identifying the respective ones of the plurality of portable device orientations;
   capturing, with a biometric sensor, a biometric sample;
   comparing, by executing an instruction with at least one processor, the biometric sample to the stored first biometric data set, the first biometric data set corresponding to a first portable device orientation;

based on the comparing of the biometric sample to the first biometric data set, changing the content orientation.

8. The method defined in claim 7, wherein the comparing of the biometric sample to the biometric data set includes identifying the first biometric data set of the plurality of biometric data sets as a match to the biometric sample, and storing the first portable device orientation identifier corresponding to the first biometric sample as a current portable device orientation.

9. The method defined in claim 8, wherein the changing of the content orientation includes comparing the current portable device orientation to the content orientation and, when the current portable device orientation and the content orientation are different, changing the content orientation to match the current portable device orientation.

10. The method defined in claim 7, wherein the content orientation is a first content orientation and the changing of the first content orientation includes changing from the first content orientation to a second content orientation.

11. A tangible machine readable storage medium comprising instructions which, when executed, cause a portable electronic device to at least:
prompt a user to supply biometric training data while holding the portable electronic device in a plurality of corresponding portable device orientations, including a first portable device orientation, relative to the user;
store at least some features of the biometric training data corresponding to the plurality of portable device orientations, including the first portable device orientation, as corresponding biometric data sets;
based on a biometric sample, identify the portable device as being in the first portable device orientation relative to the user;
compare the first portable device orientation to a content orientation at which a display device of the portable electronic device is currently presenting content; and
based on the comparison of the first portable device orientation and the content orientation, change the content orientation.

12. The tangible machine readable storage medium defined in claim 11, wherein the instructions cause the portable electronic device to identify the portable electronic device as being in the portable device orientation by: comparing the biometric sample to a plurality of biometric data sets, and identifying a portable device orientation identifier corresponding to the biometric data set that matches the biometric sample.

13. The tangible machine readable storage medium defined in claim 12, wherein the instructions cause the portable electronic device to compare the first portable device orientation to the content orientation by comparing the portable device orientation identifier to a content orientation identifier representing the content orientation at a current time.

14. The tangible machine readable storage medium defined in claim 13, wherein when the content orientation has been changed the content orientation identifier does not match the portable device orientation identifier.

15. The tangible machine readable storage medium defined in claim 13, wherein when the content orientation has not been changed, the content orientation identifier matches the portable device orientation identifier.

16. The tangible machine readable storage medium defined in claim 11, wherein the biometric sensor is at least one of a fingerprint sensor or an image sensor.

* * * * *